(12) United States Patent
Li et al.

(10) Patent No.: US 10,885,046 B2
(45) Date of Patent: Jan. 5, 2021

(54) SYSTEMS AND METHODS FOR QUERYING A DATABASE

(71) Applicant: BEIJING DIDI INFINITY TECHNOLOGY AND DEVELOPMENT CO., LTD., Beijing (CN)

(72) Inventors: Sixu Li, Beijing (CN); Xiang Wan, Beijing (CN); Pei Li, Beijing (CN); Fan Yang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/724,298

(22) Filed: Dec. 22, 2019

(65) Prior Publication Data
US 2020/0142900 A1    May 7, 2020

Related U.S. Application Data

(63) Continuation of application No. PCT/CN2018/092387, filed on Jun. 22, 2018.

(30) Foreign Application Priority Data

Jun. 22, 2017 (CN) .......................... 2017 1 0482300

(51) Int. Cl.
*G06F 16/2457* (2019.01)
*G06F 16/2455* (2019.01)
(Continued)

(52) U.S. Cl.
CPC .... *G06F 16/24578* (2019.01); *G06F 16/2282* (2019.01); *G06F 16/244* (2019.01); *G06F 16/24542* (2019.01); *G06F 16/24553* (2019.01)

(58) Field of Classification Search
CPC ......... G06F 16/24578; G06F 16/24553; G06F 16/2282; G06F 16/24542; G06F 16/244
See application file for complete search history.

(56) References Cited

U.S. PATENT DOCUMENTS

| 9,104,665 | B1 * | 8/2015 | Bik ......................... G06F 16/00 |
| 2010/0306216 | A1 | 12/2010 | Andersen et al. |

(Continued)

FOREIGN PATENT DOCUMENTS

| CN | 102214214 A | 10/2011 |
| CN | 102332009 A | 1/2012 |

(Continued)

OTHER PUBLICATIONS

International Search Report in PCT/CN2018/092387 dated Sep. 30, 2018, 4 pages.

(Continued)

*Primary Examiner* — James Trujillo
*Assistant Examiner* — Michal Bogaki
(74) *Attorney, Agent, or Firm* — Metis IP LLC

(57) ABSTRACT

The present disclosure provides systems and methods for providing database query service to a user. The method may comprise: obtaining, a query request to query a database, wherein the database includes a plurality of data tables; determining one or more target data tables among the plurality of data tables based on the service request; generating a directed graph based on the plurality of data tables, wherein the directed graph includes one or more segment, each of which links two data tables; determining a reference data table among the one or more target data tables; for each of the one or more target data tables, traversing the directed graph to determine a target path with the shortest distance (Continued)

between the reference data table and a target data table; and, querying the database based on one or more target paths with the shortest paths.

12 Claims, 9 Drawing Sheets

(51) Int. Cl.
*G06F 16/22* (2019.01)
*G06F 16/2453* (2019.01)
*G06F 16/242* (2019.01)

(56) References Cited

U.S. PATENT DOCUMENTS

| | | | | |
|---|---|---|---|---|
| 2016/0104227 | A1* | 4/2016 | Gauthier | G06F 16/9024 705/26.62 |
| 2016/0179883 | A1* | 6/2016 | Chen | G06F 16/24544 707/714 |
| 2016/0283568 | A1* | 9/2016 | Praver | G06F 16/2477 |
| 2017/0004175 | A1* | 1/2017 | Li | G06F 16/24542 |
| 2017/0116315 | A1* | 4/2017 | Xiong | G06F 16/2228 |
| 2017/0364582 | A1* | 12/2017 | Pan | G06F 16/2282 |
| 2018/0210966 | A1* | 7/2018 | Bedi | G06F 16/90335 |
| 2018/0218088 | A1* | 8/2018 | Fischer | G06F 16/284 |
| 2018/0322166 | A1* | 11/2018 | Geigel | G06F 16/2428 |

FOREIGN PATENT DOCUMENTS

| | | |
|---|---|---|
| CN | 102831120 A | 12/2012 |
| CN | 103823846 A | 5/2014 |
| CN | 104573039 A | 4/2015 |
| WO | 2014101176 A1 | 7/2014 |

OTHER PUBLICATIONS

Written Opinion in PCT/CN2016/092387 dated Sep. 30, 2018, 4 pages.
First Office Action in Chinese Application No. 201710482300.1 dated May 7, 2020, 11 pages.

* cited by examiner

SYSTEMS AND METHODS FOR QUERYING A DATABASE

CROSS-REFERENCE TO RELATED APPLICATIONS

This application is a Continuation of International Application No. PCT/CN2018/092387, filed on Jun. 22, 2018, which claims priority to Chinese Patent Application No. 201710482300.1 filed on Jun. 22, 2017, the contents of each of which are incorporated herein by reference in their entirety.

TECHNICAL FIELD

The present disclosure generally relates to technology field of database querying techniques, and in particular, systems and methods for querying a database according to a shortest path between two different data tables.

BACKGROUND

A database is a warehouse that organizes, stores, and manages data according to data structures. Currently, in the organization and management of a database, a data table can be generated. When a user wants to query data related to specific fields, corresponding data can be found based on the data table. If the fields that the user wants to query are distributed in multiple data tables, the multiple data tables may be linked and then the corresponding data may be searched by the user based on the linked multiple data tables. However, with the increase of data tables in a database, the linking of the data tables may consume a lot of time and processing resources. Thus, it is desirable to providing a system and a method to improve the efficiency of querying data related to multiple fields when the multiple fields is distributed in a mass of different data tables.

SUMMARY

According to a first aspect of the present disclosure, a system configured to provide database query service is provided. The system may include at least one non-transitory storage medium including a set of instructions; and at least one processor in communication with the at least one non-transitory storage medium, wherein when executing the set of instructions, the at least one processor may be directed to: obtain a query request to query a database, wherein the database includes a plurality of data tables; determine one or more target data tables among the plurality of data tables based on the service request; generate a directed graph based on the plurality of data tables, wherein the directed graph includes one or more segment, each of which links two data tables; determine a reference data table among the one or more target data tables; for each of the one or more target data tables, traverse the directed graph to determine a target path with the shortest distance between the reference data table and a target data table; and, query the database based on one or more target paths with the shortest paths.

In some embodiments, to generate the directed graph based on the plurality of data tables, the at least one processor may be further directed to: traverse the database and determine a first data table and a second data table among the a plurality of data tables; when the first data table and second data table have a common field, generate a segment of between the first data table and the second data table.

In some embodiments, the segment between the first data table and the second data table may have a direction from the first data table to the second data table, or a direction from the second data table to the first data table.

In some embodiments, the at least one processor may be further directed to: determine whether the first data table is a target data table; in response to a determination that the first table is the target data table, assign a first weight to the segment between the first data table and the second data table having the direction from the first data table to the second data table.

In some embodiments, the at least one processor may be further directed to: in response to a determination that the first data table is not the target data table, assign a second weight to the segment between the first data table and the second data table having the direction from the first data table to the second data table.

In some embodiments, the second weight may be larger than the first weight.

In some embodiments, the reference data table may be randomly determined among the one or more target data tables.

In some embodiments, a target path with the shortest path may include one or more data tables, and to query the database based on the one or more target paths with the shortest paths, the at least one processor is further directed to: generate an initial table set; traverse the one or more target paths; for each of the one or more target paths, determine whether a data table included in the target path is within the initial table set; in response to a determination that the data table included in the target path is not within the initial table set, add the data table into the initial table set; and link the data tables in the initial table set to generate a linked table set; and query the database based on the linked table set.

In some embodiments, the one or more target data tables may be determined based on a field of the query request.

According to a second aspect of the present disclosure, a method implemented on a computing device for querying a database is provided. The computing device may include a memory and one or more processors. The method may include: obtaining, by the one or more processors, a query request to query a database, wherein the database includes a plurality of data tables; determining, by the one or more processors, one or more target data tables among the plurality of data tables based on the service request; generating, by the one or more processors, a directed graph based on the plurality of data tables, wherein the directed graph includes one or more segment, each of which links two data tables; determining, by the one or more processors, a reference data table among the one or more target data tables; for each of the one or more target data tables, traversing, by the one or more processors, the directed graph to determine a target path with the shortest distance between the reference data table and a target data table; and, querying, by the one or more processors, the database based on one or more target paths with the shortest paths.

According to a third aspect of the present disclosure, a non-transitory computer readable medium embodying a computer program product is provided. The computer program product may include instructions configured to cause a computing device to: obtain a query request to query a database, wherein the database includes a plurality of data tables; determine one or more target data tables among the plurality of data tables based on the service request; generate a directed graph based on the plurality of data tables, wherein the directed graph includes one or more segment, each of which links two data tables; determine a reference data table among the one or more target data tables; for each of the one or more target data tables, traverse the directed graph to determine a target path with the shortest distance between the reference data table and a target data table; and, query the database based on one or more target paths with the shortest paths.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. The foregoing and other aspects of embodiments of present disclosure are made more evident in the following detail description, when read in conjunction with the attached drawing figures.

DETAILED DESCRIPTION

Figure 1:
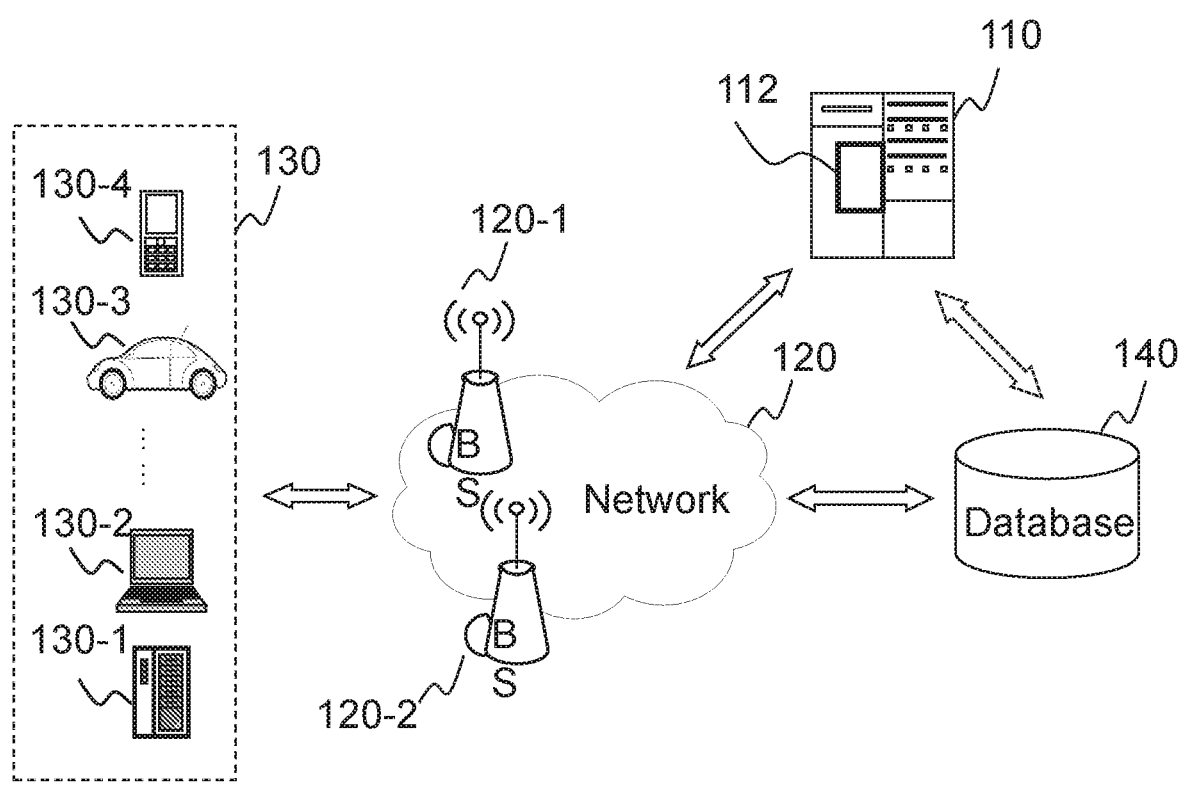
FIG. 1 is a block diagram of an exemplary system for querying a database according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

The term "data table" or "table" in the present disclosure may refer to a collection of data elements organized in a structured format. A database may include one or more data tables. In some embodiments, a data table may include one or more columns and one or more rows. The term "field" or "column" may refer to a set of data values of a particular attributes of different entities or records or rows. The term "row" or "record" may refer to a set of data values of different attributes or fields related to the same subject. For example, table 1 shown below is an exemplary data table illustrated according to some embodiments of the present disclosure.

TABLE 1

| username | Order price (RMB) | Order duration (minutes) |
|---|---|---|
| USER1 | 50 | 36 |
| USER2 | 30 | 16 |
| USER3 | 43 | 28 |

As shown in Table 1, a row (e.g., USER1, 50, 36) may represent at least partial information of a taxi service initiated or requested by a user (e.g., a taxi service initiated by the USER1 may have an order price of 50 RMB and an order duration of 36 minutes). The different columns or fields (e.g., username, order price, order duration) may represent different attributes of the order. For another example, table 2 shown below is another exemplary data table illustrated according to some embodiments of the present disclosure.

TABLE 2

| username | age | gender |
|---|---|---|
| USER1 | 29 | Female |
| USER2 | 31 | Female |
| USER3 | 23 | male |

As shown in Table 2, a row (e.g., USER1, 29, female) may represent at least partial information of a user. The different columns or fields (e.g., usemame, order price, order duration) may represent different attributes of the user. In some embodiment, a database may include Table 1, Table 2 and other data tables with same or different fields.

If a user wants to query a specific field, the user needs to query the database to obtain the data table containing the specific field. If the user wants to query multiple fields which are distributed in different data tables, the user needs to obtain the data tables containing the multiple fields respectively and link these data tables, then query the multiple fields in the linked data tables. For example, as illustrated in the Table 1 and Table 2 mentioned above, if the user wants to query the fields "order prices" and "gender", the Table 1 and Table 2 should be linked first, then the user could query the fields "order prices" and "gender" in the linked data table. However, since the number of data tables stored in the database is usually enormous, and most of the data tables may not contain the fields that the user wants to query. Linking all the data tables would consume a lot of time and processing resources.

An aspect of the present disclosure relates to online systems and methods for querying a plurality of fields distributed in multiple data tables in a database. According to some embodiments of the present disclosure, a digraph of one or more target data tables where the multiple fields that a user wants to query are located may be determined. The target data tables to be linked may be determined based on the digraph. The query may be performed based on the linked data tables. When the query field is distributed in multiple data tables, the system or method provided by the present disclosure does not need to link all the data tables in the database, thereby saving the processing resources in the database query and improving the query efficiency.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order or simultaneously. Moreover, one or more other operations may be added to the flowcharts. One or more operations may be removed from the flowcharts.

FIG. 1 is a block diagram of an exemplary system 100 for querying a database according to some embodiments of the present disclosure. System 100 may include a server 110, a network 120, a terminal 130, and a database 140. The server 110 may include a processing engine 112.

The server 110 may be configured to process information and/or data relating to a plurality of service requests, for example, the server 110 may be configured to query the database 140. In some embodiments, the server 110 may be configured to generate a data table and store the data table in the database 140. In some embodiments, the server 110 determine one or more target data tables in the database 140. In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the terminal 130 and/or the database 140 via the network 120. As another example, the server 110 may be directly connected to the terminal 130 and/or the database 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device having one or more components illustrated in FIG. 2 in the present disclosure.

In some embodiments, the server 110 may include a processing engine 112. The processing engine 112 may process information and/or data relating to the requests to perform one or more functions described in the present disclosure. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the terminal 130 may include a passenger terminal and a driver terminal. The passenger terminal and the driver terminal may be referred to as a user that may be an individual, a tool or other entity directly relating to the requests. In some embodiments, the terminal 130 may include a mobile device 130-1, a tablet computer 130-2, a laptop computer 130-3, and a built-in device 130-4 in a motor vehicle, or the like, or any combination thereof. In some embodiments, a user may send a query request to query the database 140. In some embodiments, the server 110 may generate a data table by collecting data transmitted by the passenger terminal or the driver terminal. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, built-in device in the motor vehicle 130-4 may include an onboard computer, an onboard television, etc. Merely by way of example, the terminal 130 may include a controller (e.g., a remote-controller).

The network 120 may facilitate exchange of information and/or data. In some embodiments, one or more components in the system 100 (e.g., the server 110, the terminal 130, and the database 140) may send and/or receive information and/or data to/from other component(s) in the system 100 via the network 120. For example, the server 110 may obtain/acquire service request from the terminal 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. In some embodiments, the server 110 may include one or more network access points. For example, the server 110 may include wired or wireless network access points such as base stations and/or internet exchange points 120-1, 120-2, . . . , through which one or more components of the system 100 may be connected to the network 120 to exchange data and/or information.

The database 140 may store data and/or instructions. In some embodiments, the database 140 may store data obtained/acquired from the terminal 130. In some embodiments, the database 140 may store different models that executed or used by the server 110 to perform exemplary methods described in the present disclosure. In some embodiments, the database 140 may store different data tables. In some embodiments, the database 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 140 may be connected to the network 120 to communicate with one or more components in the system 100 (e.g., the server 110, the terminal 130). One or more components in the system 100 may access the data or instructions stored in the database 140 via the network 120. In some embodiments, the database 140 may be directly connected to or communicate with one or more components in the system 100 (e.g., the server 110, the terminal 130, etc.). In some embodiments, the database 140 may be part of the server 110.

Figure 2:
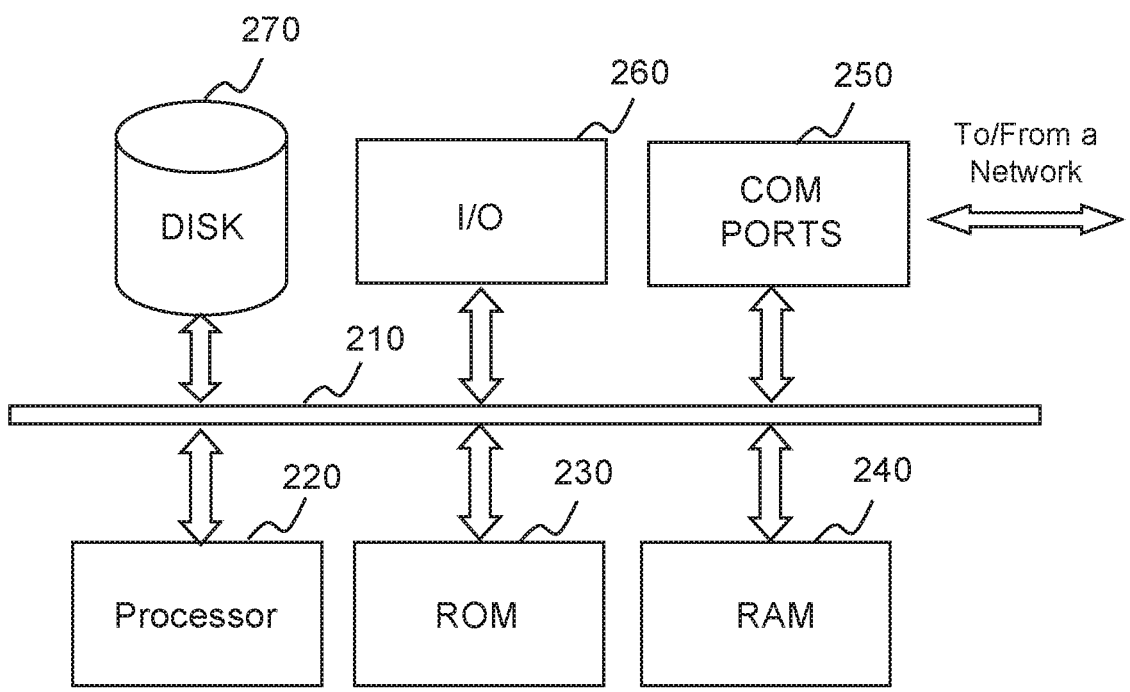
FIG. 2 is a schematic diagram illustrating exemplary hardware and software components of a computing device according to some embodiments.

FIG. 2 is a schematic diagram illustrating exemplary components of a computing device according to some embodiments of the present disclosure. The server 110, the driver terminal 120, and/or the storage device 130 may be implemented on the computing device 200 according to some embodiments of the present disclosure. The particular system may use a functional block diagram to explain the hardware platform containing one or more user interfaces. The computer may be a computer with general or specific functions. Both types of the computers may be configured to implement any particular system according to some embodiments of the present disclosure. Computing device 200 may be configured to implement any components that perform one or more functions disclosed in the present disclosure. For example, the computing device 200 may implement any component of the system 100 as described herein. In FIGS. 1 and 2, only one such computer device is shown purely for convenience purposes. One of ordinary skill in the art would understand at the time of filing of this application that the computer functions relating to the service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may include the internal communication bus 210, program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or another type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus, operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
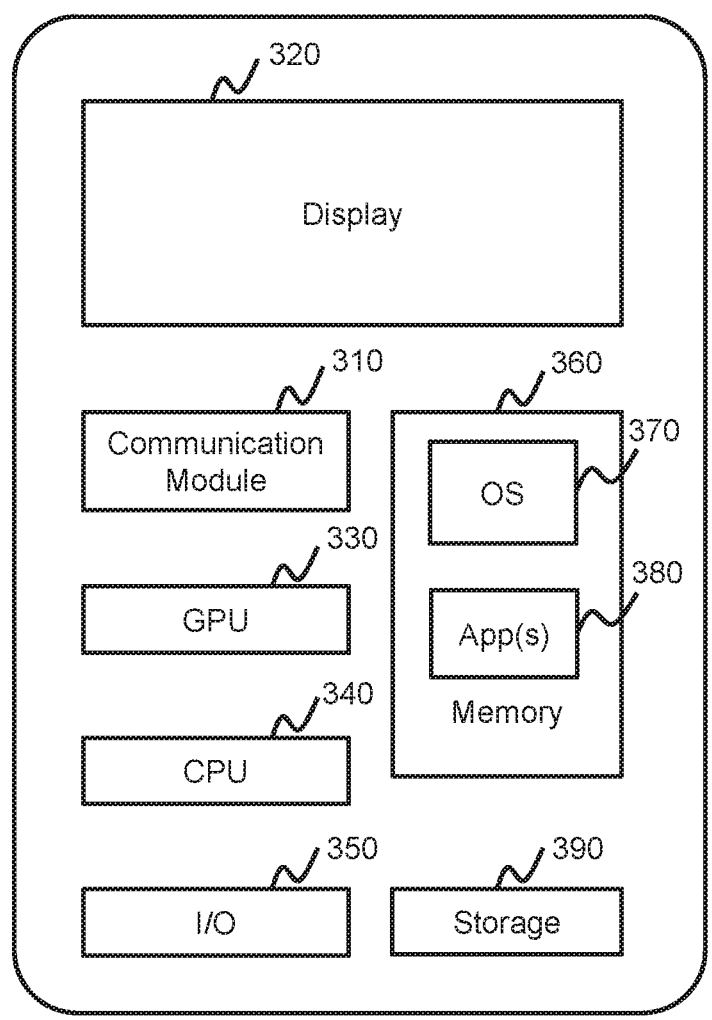
FIG. 3 is a block diagram illustrating exemplary hardware and/or software components of an exemplary mobile device according to some embodiments of the present disclosure.

FIG. 3 is a block diagram illustrating exemplary hardware and/or software components of an exemplary mobile device according to some embodiments of the present disclosure. The driver terminal may be implemented on the mobile device 300 according to some embodiments of the present disclosure. As illustrated in FIG. 3, the mobile device 300 may include a communication module 310, a display 320, a graphics processing unit (GPU) 330, a central processing unit (CPU) 340, an I/O 350, a memory 360, and a storage 390. The CPU 340 may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for transmitting the trajectory data to the server 110. User interaction with the information stream may be achieved via the I/O devices 350 and provided to the processing engine 112 and/or other components of the system 100 via the network 140.

In order to implement various modules, units and their functions described above, a computer hardware platform may be used as hardware platforms of one or more elements (e.g., a component of the server 110 described in FIG. 1). Since these hardware elements, operating systems, and program languages are common, it may be assumed that persons skilled in the art may be familiar with these techniques and they may be able to provide information required in the traffic lights controlling according to the techniques described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the figures.

Figure 4:
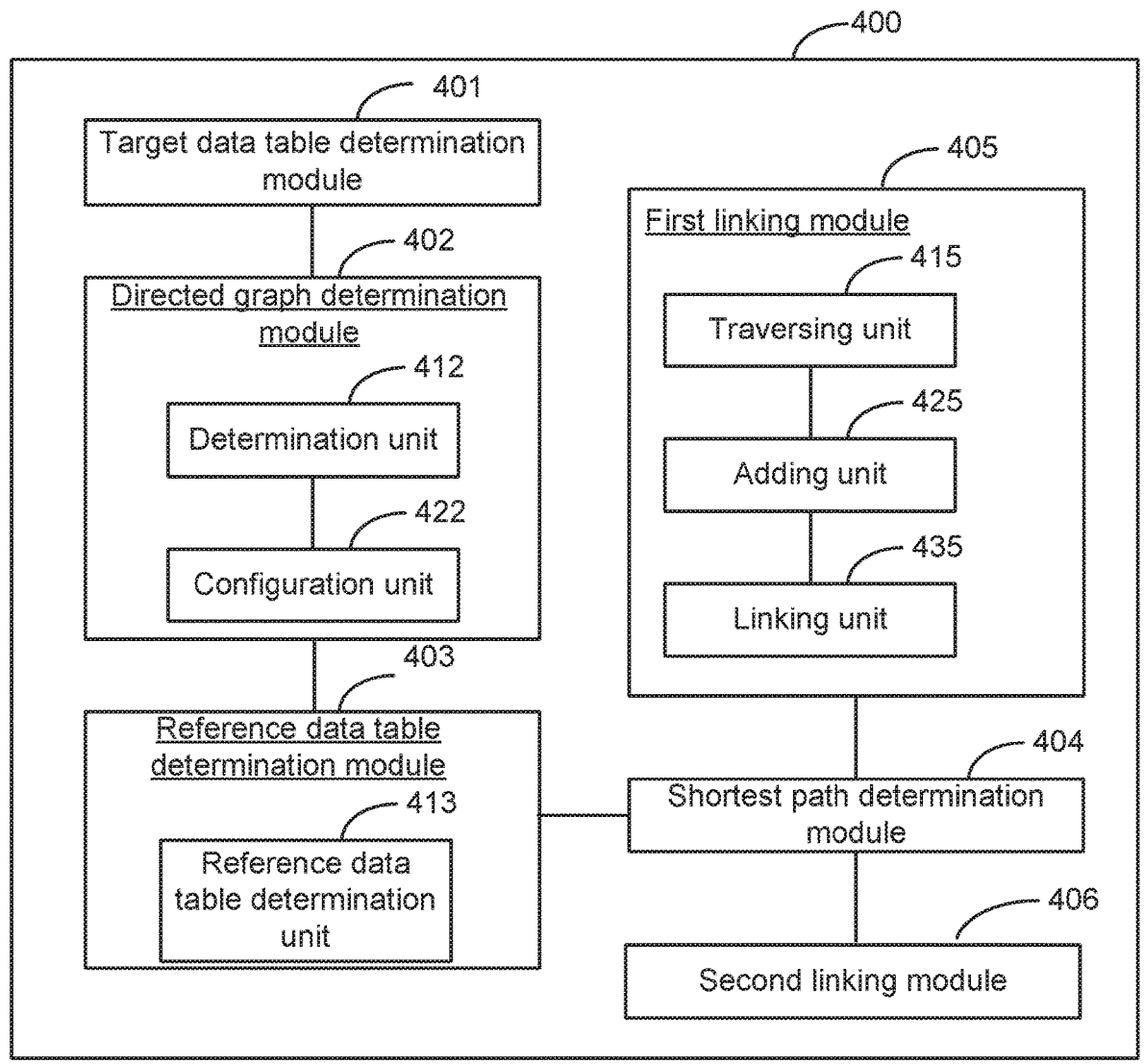
FIG. 4 is a block diagram illustrating an exemplary processing engine according to some embodiments.

FIG. 4 is a block diagram illustrating an exemplary processing engine 112 according to some embodiments of the present disclosure. The processing engine 112 may include a target data table determination module 401, a directed graph determination module 402, a reference data table determination module 403, a shortest path determination module 404, a first linking module 405 and a second linking module 406.

The target data table determination module 401 may obtain a query request encoded by the database query instruction. A user may input the database query instruction, indicating one or more target fields that the user wants to query, via an interface provided by the target data table determination module 401. The database may include a plurality of data tables. In some embodiments, the one or more target fields may be distributed in the plurality of data tables. After receiving the data query instruction, the target data table determination module 401 may determine the data table where the one or more target fields are located as the target tables. The data table where the target query field is located may be referred to as a target data table. Taking the Table 1 and Table 2 mentioned above as examples, if the order price and gender are determined as the target query field according to the data query instruction, the target data table determination module 401 may determine the Table 1 and the Table 2 as the target data tables.

The directed graph determination module 402 may generate a directed graph based on the one or more target data tables. The term "directed graph" in the present disclosure may refer to a graphic or a non-graphic structure indicating a data access between at least partial of the plurality of the data tables in the database. In some embodiments, the directed graph (e.g., a graphic directed graph) may be represented by visual indicators indicating logic relationships between the at least partial of the plurality of the data tables in the database.

In some embodiments, the graph determination module 402 may further include a determination unit 412 and a configuration unit 422. The directed graph determination module 402 or the determination unit 412 may establish a path from the first data table to a second data table if the first data table and the second data table have one or more common fields. The second data table may be a data table other than the first date base. When traversing to the second data table, the processor may establish the path of the second data table to the first data table. The processor may establish a bidirectional path between the two data tables when the two data tables have a common field. For example, as shown in the Table 1 and Table 2 mentioned above, the order dimension data Table 1 and the user dimension data Table 2 have a common field "user name", thus the directed graph determination module 402 or the determination unit 412 may establish a bidirectional path between the order dimension data table and the user dimension data table, which means that a path (or a segment) from the user dimension data Table 1 to the order dimension data Table 2, and a path (or a segment) from the order dimension data Table 2 to the user dimension data Table 1 are established.

Figure 7A:
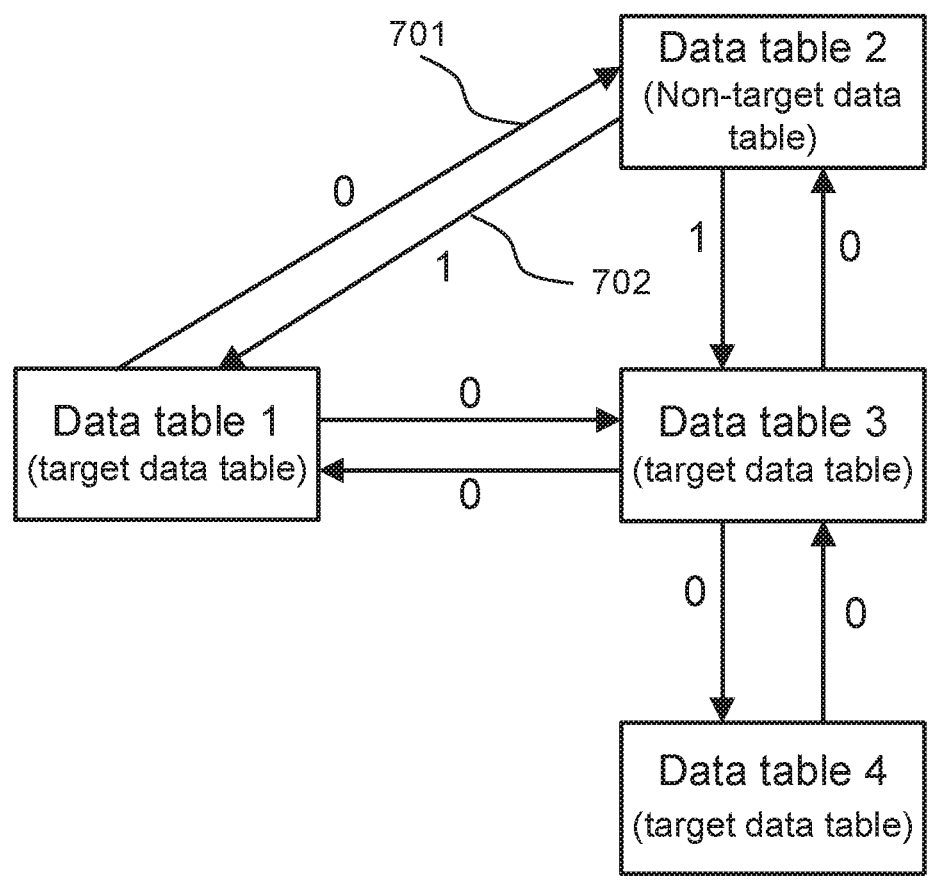
FIG. 7A is a schematic diagram illustrating an exemplary directed graph according to some embodiments of the present disclosure.

If the first data table is the target data table, the directed graph determination module 402 or the configuration unit 422 may assign a first weight to the path (or segment) from the first data table to the second data table. If the first data table is the non-target data table, the directed graph determination module 402 or the configuration unit 422 may assign a second weight to the path (or segment) from the second data table to the first data table. In some embodiments, the second weight may be greater than the first weight. For example, as illustrated in FIG. 7A, the segment 701 derives from the target data table 1, thus a first weight 0 is assigned to the segment 701. The segment 702 derives from the non-target data table 2, thus a second weight 1 is assigned to the segment 702. Similarly, the segment deriving from the data table 2 to the data table 3 may have a second weight 1. The segment deriving from the data table 3 to the data table 4 may have a first weight 0. The segment deriving from the data table 3 to the data table 1 may have a first weight 0. The segment deriving from the data table 4 to the data table 3 may have a first weight 0.

The reference data table determination module 403 may determine a reference data table among the one or more target data tables. The directed graph generated may include the one or more target data tables, and the reference data table is one of the one or more target data tables. In some embodiments, the reference data table may be considered as an origin to link the one or more target data tables. In some embodiments, the reference data table determination module 403 may further include a reference data table determination unit 413. The reference data table may be randomly determined among the one or more target data tables by the reference data table determination module 403 or the reference data table determination unit 413, that is, the reference data table determination module 403 or the reference data table determination unit 413 may randomly select a target data table from all the one or more target data tables as the reference data table.

The shortest path determination module 404 may traverse the directed graph to determine a target path for each of the target tables. The shortest path determination module 404 may determine the shortest distance from the reference data table to other target data table by shortest path algorithm such as Dijkstra algorithm. The shortest path determination module 404 may record the data tables that the shortest path passes through to determine the shortest path corresponding to the shortest distance during determining the shortest distance.

For example, as illustrated in FIG. 7A, assuming the data table 1 is determined as the reference data table according to some embodiments of the operation 502, the processor (e.g., shortest path determination module 404 of the processing engine 112) may determine a shortest path between the reference table (i.e., data table 1) and the data table 3, a shortest path between the reference table and the data table 4, while the data table 3 and data table 4 are the target data tables. As shown in FIG. 7A, there are more than one path between the reference data table (i.e., the data table 1) and data table 3. For example, one path is data table 1→data table 3, which a length of the path between the reference table (i.e., data table 1) and the data table 3 is 0, and another path is data table 1→data table 2→data table 3, which a length of the path of between the reference table (i.e., data table 1) and the data table 3 is 1. Thus, the shortest distance from data table 1 to data table 3 is 0, the shortest path (or the target path from the reference table to the data table 3) is data table 1→data table 3. Similarly, the shortest distance from data table 1 to data table 4 is 0, and the shortest path (or the target path from the reference table to the data table 4) is data table 1→data table 3→data table 4.

The first linking module 405 may query the database based on the one or more target paths. In some embodiments, after determining the shortest paths of the reference data table to each target data tables, the first linking module 405 may link the data tables that the shortest paths pass through. The first linking module 405 may query based on the linking set, that is, that the first linking module 405 may query the linked data tables to acquire the target query field of the user.

For example, as illustrated in FIG. 7A, the data tables that the shortest path from the data table 1 to the data table 3 passes through are data table 1 and data table 3, and the data tables that the shortest path from the data table 1 to the data table 4 passes through are data table 1, data table 3, and data table 4. Thus the first linking module 405 may link the data table 1, data table 3, data table 4, and acquire the target query field of the user by querying the linked data table 1, data table 3, data table 4. Detailed description related to querying based on the shortest path (or the target path) may be found elsewhere according to some embodiments of the present disclosure (e.g., FIG. 8 and description thereof).

Figure 5:
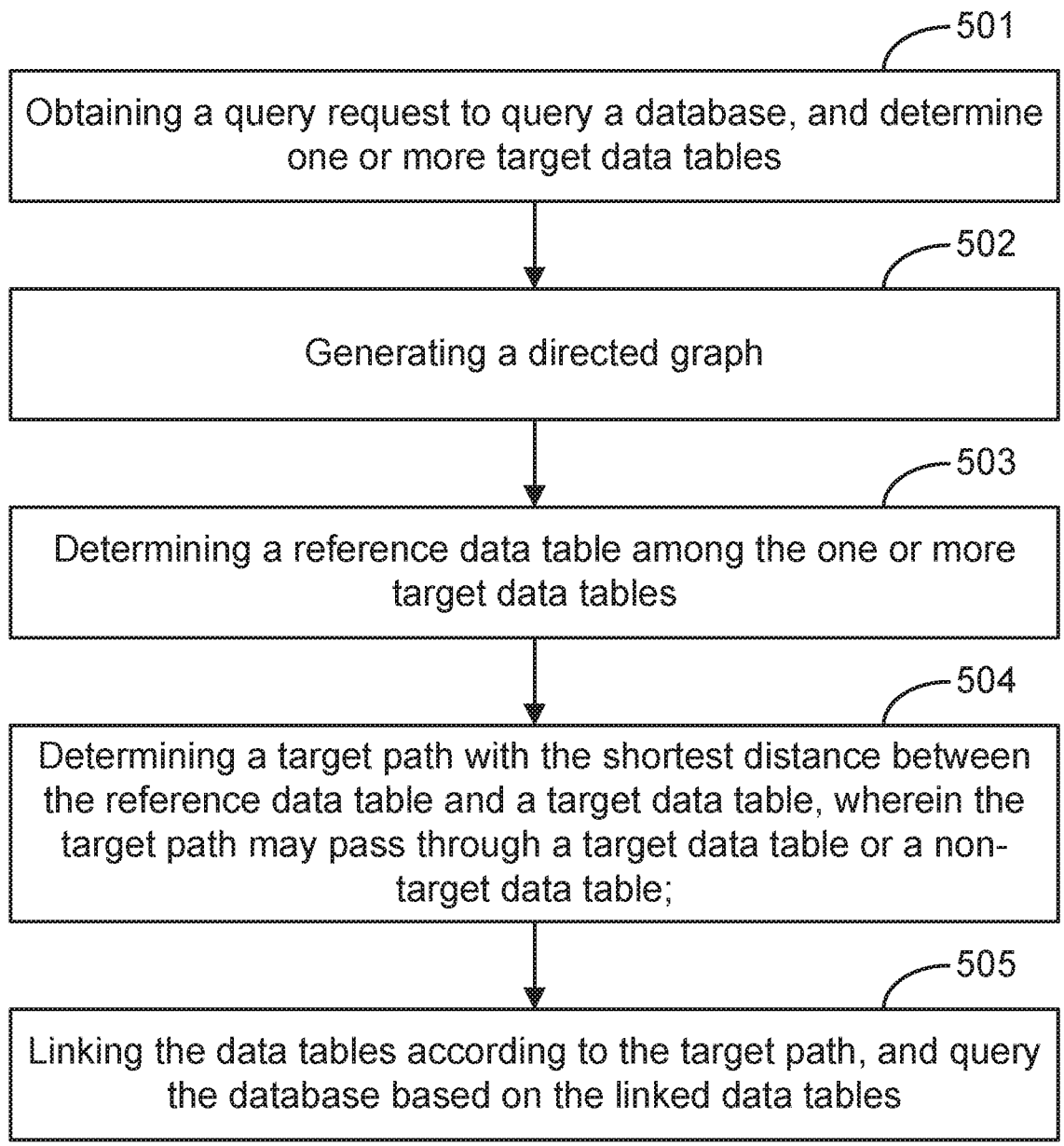
FIG. 5 is a flowchart of an exemplary process and/or method for querying a database according to some embodiments of the present disclosure.

The first linking module 405 may further include a traversing unit 415, an adding unit 425, and a linking unit 435. The first linking module 405 or the traversing unit 415 may traverse the one or more shortest paths of the directed graph. For each of the one or more shortest paths (i.e., the one or more target paths determined according to some embodiments as illustrated in FIG. 5), the first linking module 405 or the traversing unit 415 may determine whether a data table that the shortest path passes through has joined in a linking set. In some embodiments, the linking set may be empty initially. Then the first linking module 405 or the traversing unit 415 may traverse the one or more target paths. For each of the traversed target paths, the first linking module 405 or the traversing unit 415 may successively determine whether the data tables that the traversed target path pass through have joined in the linking set which is empty initially.

The first linking module 405 or the adding unit 425 may add the data table in the linking set if the data table is not in the linking set. In response to a determination that the data table that a traversed target path passes through is not within the linking set, the first linking module 405 or the adding unit 425 may add such a data table into the linking set. For example, as illustrated in FIG. 7A, assuming that the processor may traverse the shortest path from the data table 1 to the data table 3, the processor may add the data table 1 and 3 to the linking set since the linking set is empty initially. However, when traversing the shortest path from the data table 1 to the data table 4, the processor may add the data table 4 to the linking set since the data table 1 and the data table 3 have been added to the linking set. Finally, the linking set may include the data table 1, the data table 3 and the data table 4 after the processor have traversed all the shortest paths in the directed graph.

The first linking module 405 or the linking unit 435 may link the data tables in the linking set. After traverse all the shortest paths of the directed graph, the first linking module 405 or the linking unit 435 may link the data tables in the linking set to generate a linked data table. The linked data table may include the one or more target fields that the user wants to query, and the user may query the database based on the linked data table.

The second linking module 406 may link all the data tables if the reference data table cannot reach a target data table. For example, if there is no path or segment between the reference data table and a target data tale, during determining the shortest distance from the reference data table to other target data tables, the second linking module 406 may linking all data tables and query based on the linking result.

It should be noted that the descriptions above in relation to the processing engine 112 are provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, the processing engine 112 may further include a storage module (not shown in FIG. 4). The storage module may be configured to store data generated during any process performed by any component of in the processing engine 112. As another example, each of components of the processing engine 112 may associate with a storage module. Additionally or alternatively, the components of the processing engine 112 may share a common storage module. Similar modifications should fall within the scope of the present disclosure.

FIG. 5 is a flowchart illustrating an exemplary process for querying a database according to some embodiments of the present disclosure. The process 500 may be executed by the system 100. For example, the process 500 may be implemented as a set of instructions (e.g., an application) stored in the storage device 130 and invoked and/or executed by the processing device 120 (e.g., the processor 210 of the computing device 200 as illustrated in FIG. 2, the GPU 330 or CPU 340 of the mobile device 300 as illustrated in FIG. 3). The processing engine 112 may execute the set of instructions and, when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 501, after receiving a database query instruction, one or more target data tables may be determined based on one or more target fields included in the data query instruction. In some embodiment, the processor (e.g., the target data table determination module 401 of the process engine 112) may obtain a query request encoded by the database query instruction. A user may input the database query instruction, indicating one or more target fields that the user wants to query, via an interface provided by an input device of the processor (e.g., the target data table determination module 401 of the process engine 112). The database may include a plurality of data tables. In some embodiments, the one or more target fields may be distributed in the plurality of data tables. After receiving the data query instruction, the processor (e.g., the target data table determination module 401 of the process engine 112) may determine the data table where the one or more target fields are located as the target tables. The data table where the target query field is located may be referred to as a target data table. Taking the Table 1 and Table 2 mentioned above as examples, if the order price and gender are determined as the target query field according to the data query instruction, the processor (e.g., the target data table determination module 401 of the process engine 112) may determine the Table 1 and the Table 2 as the target data tables.

In 502, a directed graph may be generated based on the one or more target data tables. The processor (e.g., the directed graph determination module 402 of the process engine 112) may generate the directed graph based on the one or more target data tables. The term "directed graph" in the present disclosure may refer to a graphic or a non-graphic structure indicating a data access between at least partial of the plurality of the data tables in the database. In some embodiments, the directed graph (e.g., a graphic directed graph) may be represented by visual indicators indicating logic relationships between the at least partial of the plurality of the data tables in the database. In some embodiments, the directed graph (e.g., a non-graphic directed graph) may be represented by computer codes encoding logic relationships between the at least partial of the plurality of the data tables in the database. The directed graph represented by visual indicators may include one or more nodes and one or more segments. A segment may link two different nodes (i.e., two different data tables). In some embodiments, the two different data tables linked by the segment may have a common field. In some embodiments, the segment may have a weight. The weight may represent a virtual distance between the two different data tables. A node may represent a data table of the database. The segment between the two different nodes may represent a data access between two different nodes (e.g., two different data tables). Two segments linking the same two nodes with different directions may be considered as different segments. In some embodiments, the segment may have a direction from one node to another node, which may represent a data access sequence between the two different data tables, or may represent a linking sequence between the two different data tables. For example, if a database includes data table A, data table B and data table C, a directed graphic may be presented as A→B→C. The processor may access the data table A first, next the data table B, and last the data table C. In some embodiments, the processor may link the data table A first, next the data table B, and last the data table C. In some embodiments, the directed graph may be stored in a storage device of the system 100 in a data table form. For example, to store the directed graph, the processor may generate a data table and store the directed graph in the data table. The data table storing the directed graph may include two fields. One of the two fields may represent a node pair (or a data table pair) connected by a segment. The other field may record the weight of the segment correspond to the node pair or the data table pair. For example, table 3 shown below is an exemplary data table storing the directed graph according to some embodiments of the present disclosure. Detailed description related to the generating the directed graph may be found elsewhere according to some embodiments of the present disclosure (e.g., FIG. 6, FIG. 7A, FIG. 7B and related description thereof.) It should be noted that the above illustrations of the exemplary storage method of the directed graph is merely for an illustrative purpose. Apparently, after understanding basic principles of the storage method of the directed graph, a person skilled in the art may make various modifications and variations in forms or details in regards to the storage method of the directed graph according to the practical needs. These modifications or variations should be considered within the scope of present disclosure.

TABLE 3

| segment | weight |
|---------|--------|
| AB | 0 |
| BA | 0 |
| AC | 1 |
| CA | 0 |
| BC | 0 |
| CB | 1 |

FIG. 7A is a schematic diagram illustrating an exemplary directed graph according to some embodiments of the present disclosure. Assuming the database represented by the directed graph shown in FIG. 7A includes four databases, data table 1, data table 2, data table 3, data table 4, and the data table 1, data table 3 and data table 4 are the target data tables. A segment 701 may link the data table 1 and the data table 2 with a direction from the data table 1 to the data table 2. A segment 702 may also link the data table 1 and data table 2 with a direction from the data table 2 to the data table 1. A segment may have a weight. If the segment derives from a target data table, a first weight may be assigned to the segment. If the segment derives from a non-target data table, a second weight may be assigned to the segment. In some embodiments, the second weight may be greater than the first weight. For example, the segment 701 derives from the target data table 1, thus a first weight 0 is assigned to the segment 701. The segment 702 derives from the non-target data table 2, thus a second weight 1 is assigned to the segment 702. Similarly, the segment deriving from the data table 2 to the data table 3 may have a second weight 1. The segment deriving from the data table 3 to the data table 4 may have a first weight 0. The segment deriving from the data table 3 to the data table 1 may have a first weight 0. The segment deriving from the data table 4 to the data table 3 may have a first weight 0.

In 503, a reference data table among the one or more target data tables may be determined. The processor (e.g., the reference data table determination module 403 of the processing engine 112) may determine the reference data table among the one or more target data tables. The directed graph generated may include the one or more target data tables, and the reference data table is one of the one or more target data tables. In some embodiments, the reference data table may be considered as an origin to link the one or more target data tables. The reference data table may be randomly determined among the one or more target data tables by the processor (e.g., the reference data table determination module 403 of the processing engine 112, or the reference data table determination unit 413 of the reference data table determination module 403), that is, the processor may randomly select a target data table from all the one or more target data tables as the reference data table. In some embodiments, the reference data table may be determined before or after the generation of the directed graph as illustrated in operation 502.

It should be noted that the method to determine the reference data table is merely an illustrative example, a person skilled in the art may make various modifications and variations in forms or details in regards to the determination of the reference data table without departing from the basic principles. These modifications or variations are considered to be within the scope of present disclosure.

In 504, a shortest distance and a shortest path corresponding to the shortest distance between the reference data table and other data table may be determined. The term "path" in the present disclosure may refer to a collection of one or more segments for linking any two data tables, even the any two data tables are not linked by a common segment. A path may include one or more segments. When the path include only one segment, the path may be considered as a segment. The path may pass through one or more target data tables and/or one or more non-target data tables. A distance between the two data tables, or a length of the path linking the two data tables, may be determined based on a sum of weights of the one or more segments included in the path linking the two data tables. A shortest path (or a target path) may refer to a path from the reference data to one of other target data tables with the shortest distance. The processor (e.g., shortest path determination module 404 of the processing engine 112) may traverse the directed graph to determine a target path for each of the target tables. The processor (e.g., shortest path determination module 404 of the processing engine 112) may determine the shortest distance from the reference data table to other target data table by shortest path algorithm such as Dijkstra algorithm. The processor (e.g., shortest path determination module 404 of the processing engine 112) may record the data tables that the shortest path passes through to determine the shortest path corresponding to the shortest distance during determining the shortest distance.

For example, as illustrated in FIG. 7A, assuming the data table 1 is determined as the reference data table according to some embodiments of the operation 502, the processor (e.g., shortest path determination module 404 of the processing engine 112) may determine a shortest path between the reference table (i.e., data table 1) and the data table 3, a shortest path between the reference table and the data table 4, while the data table 3 and data table 4 are the target data tables. As shown in FIG. 7A, there are more than one path between the reference data table (i.e., the data table 1) and data table 3. For example, one path is data table 1→data table 3, which a length of the path between the reference table (i.e., data table 1) and the data table 3 is 0, and another path is data table 1→data table 2→data table 3, which a length of the path of between the reference table (i.e., data table 1) and the data table 3 is 1. Thus, the shortest distance from data table 1 to data table 3 is 0, the shortest path (or the target path from the reference table to the data table 3) is data table 1→data table 3. Similarly, the shortest distance from data table 1 to data table 4 is 0, and the shortest path (or the target path from the reference table to the data table 4) is data table 1→data table 3→data table 4.

Figure 7B:
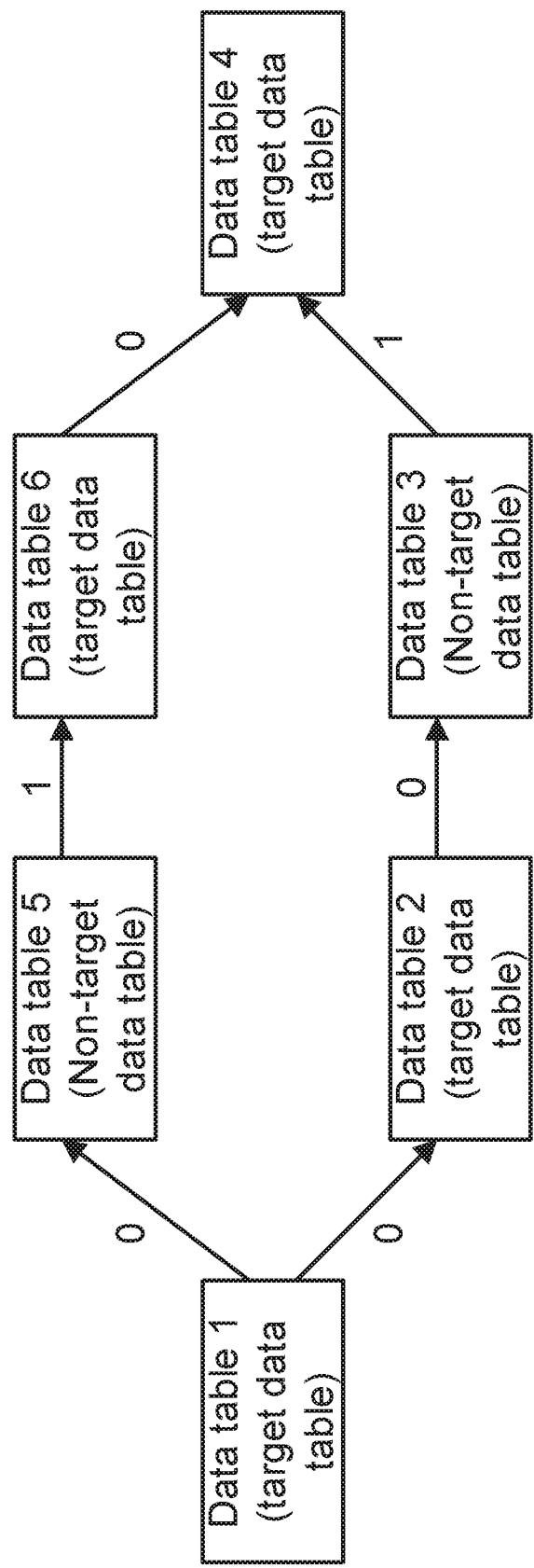
FIG. 7B is a schematic diagram illustrating an exemplary directed graph according to some embodiments of the present disclosure; and, FIG. 8 is a flowchart of an exemplary process and/or method for linking the data tables based on a shortest path according to some embodiments of the present disclosure.

In some embodiments, if there are more than one path with the shortest distance between the reference table and the target table, a path of which the reference data table is linked to a target data table may be determined as the shortest path (or the target path). For example, FIG. 7B is a schematic diagram illustrating an exemplary directed graph according to some embodiments of the present disclosure. As illustrated in FIG. 7B, assuming that data table 1, data table 2, data table 4, and data table 6 are the target data tables while data table 3 and data table 5 are the non-target data tables. The weight of the segment (or the path) between each data table are shown in FIG. 7B (not all the segments are shown in the FIG. 7B). Assuming that data table 1 is determined as the reference data table, the shortest distance between data table 1 and data table 4 may be determined as 1. There may be two the identified shortest paths, which are a path of data table 1→data table 2→data table 3→data table 4 and a path of data table 1→data table 5→data table 6→data table 4. In order to avoid the occurrence of multiple shortest paths for a same target data table, it can be specified that if there are multiple shortest paths corresponding to the shortest distance, a path of which the reference data table is linked to a target data table may be determined as the shortest path (or the target path). Since the data table 2 is the target data table and the data table 5 is the non-target data table, the path of data table 1→data table 2→data table 3→data table 4 may be determined as the shortest path from data table 1 to data table 4. In some embodiments, if there are more than one path with the shortest distance between the reference table and the target table, a path traversing from the reference data table that a non-target table appears later than other paths may be determined as the shortest path (or the target path).

In 505, the data tables that the shortest path passes through may be linked, and the query may be performed based on the linking result. The processor (e.g., the first linking module 405 of the processing engine 112) may query the database based on the one or more target paths. In some embodiments, after determining the shortest paths of the reference data table to each target data tables in operation 504, the processor may link the data tables that the shortest paths pass through. The processor (e.g., the first linking module 405 of the processing engine 112) may query based on the linking set, that is, that the processor (e.g., the first linking module 405 of the processing engine 112) may query the linked data tables to acquire the target query field of the user.

For example, as illustrated in FIG. 7A, the data tables that the shortest path from the data table 1 to the data table 3 passes through are data table 1 and data table 3, and the data tables that the shortest path from the data table 1 to the data table 4 passes through are data table 1, data table 3, and data table 4. Thus the processor (e.g., the first linking module 405 of the processing engine 112) may link the data table 1, data table 3, data table 4, and acquire the target query field of the user by querying the linked data table 1, data table 3, data table 4. Detailed description related to querying based on the shortest path (or the target path) may be found elsewhere according to some embodiments of the present disclosure (e.g., FIG. 8 and description thereof).

It should be noted that the above description of the process for querying a database is provided for the purpose of illustration, and not intended to limit the scope of the present disclosure. For persons having ordinary skills in the art, modules may be combined in various ways, or connected with other modules as sub-systems. Various variations and modifications may be conducted under the teaching of the present disclosure. However, those variations and modifications may not depart from the spirit and scope of this disclosure.

Figure 6:
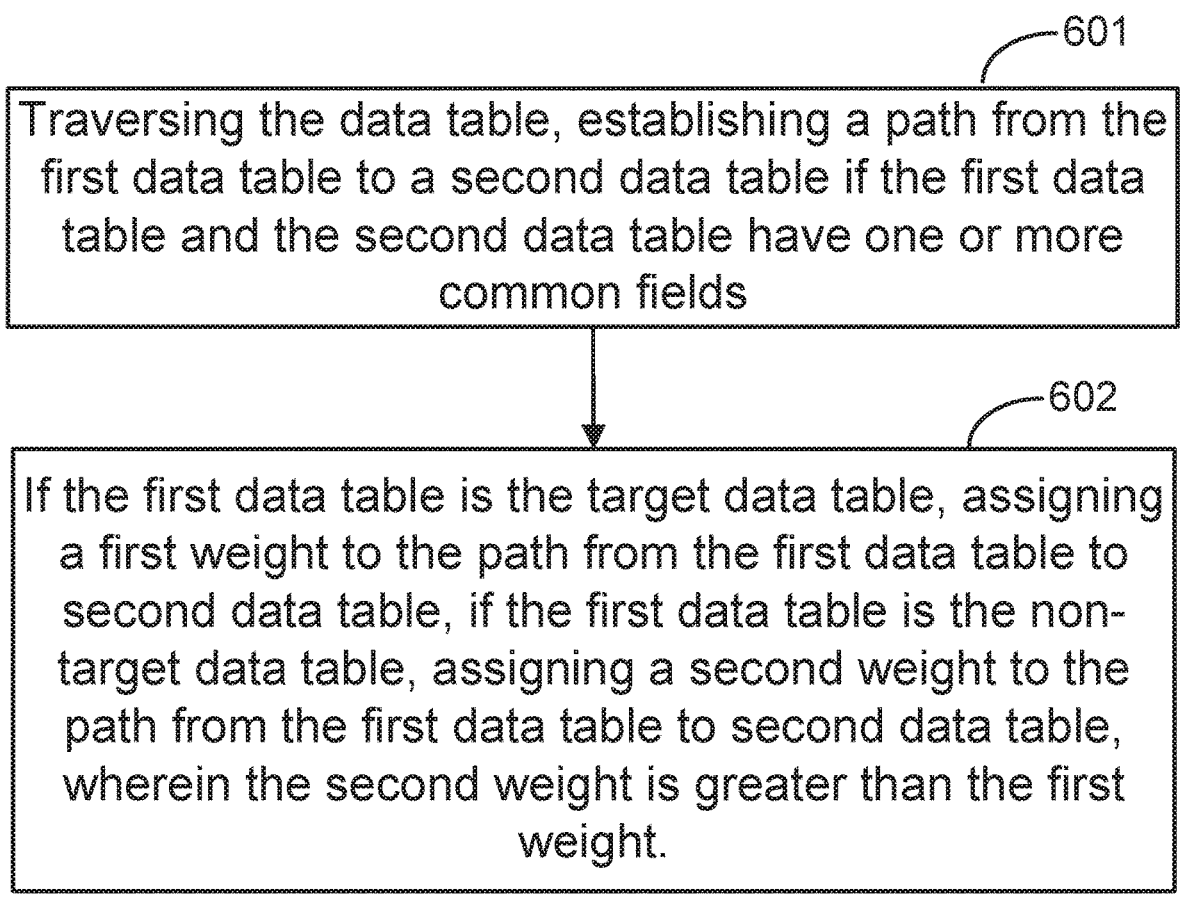
FIG. 6 is a flowchart of an exemplary process and/or method for determining a directed graph according to some embodiments of the present disclosure.

FIG. 6 is a flowchart illustrating an exemplary process for determining the directed graph according to some embodiments of the present disclosure. The process 600 may be executed by the system 100. For example, the process 600 may be implemented as a set of instructions (e.g., an application) stored in the storage device 130, and invoked and/or executed by the processing device 120 (e.g., the processor 210 of the computing device 200 as illustrated in FIG. 2, the GPU 330 or CPU 340 of the mobile device 300 as illustrated in FIG. 3). The processing engine 112 may execute the set of instructions and, when executing the instructions, it may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In 601, the processor may traverse the plurality of data tables in the database. For a traversed first data table, the processor may determine a path (or a segment) from the first data table to a second data if the first data table and the second data table have one or more common fields. The processor (e.g., the first linking module 405 of the processing engine 112, or the traversing unit 415 of the first linking module 405) may traverse the plurality of data tables stored in the database. For a traversed first data table, the processor (e.g., the directed graph determination module 402 of the processing engine 112, or the determination unit 412 of the directed graph determination module 402) may establish a path from the first data table to a second data table if the first data table and the second data table have one or more common fields. The second data table may be a data table other than the first date base. When traversing to the second data table, the processor may establish the path of the second data table to the first data table. The processor may establish a bidirectional path between the two data tables when the two data tables have a common field. For example, as shown in the Table 1 and Table 2 mentioned above, the order dimension data Table 1 and the user dimension data Table 2 have a common field "user name", thus the processor (e.g., the directed graph determination module 402 of the processing engine 112, or the determination unit 412 of the directed graph determination module 402) may establish a bidirectional path between the order dimension data table and the user dimension data table, which means that a path (or a segment) from the user dimension data Table 1 to the order dimension data Table 2, and a path (or a segment) from the order dimension data Table 2 to the user dimension data Table 1 are established.

In 602, if the first data table is the target data table, the processor (e.g., the directed graph determination module 402 of the processing engine 112, or the configuration unit 422 of the directed graph determination module 402) may assign a first weight to the path (or segment) from the first data table to the second data table. If the first data table is the non-target data table, the processor (e.g., the directed graph determination module 402 of the processing engine 112, or the configuration unit 422 of the directed graph determination module 402) may assign a second weight to the path (or segment) from the second data table to the first data table. In some embodiments, the second weight may be greater than the first weight. For example, as illustrated in FIG. 7A, the segment 701 derives from the target data table 1, thus a first weight 0 is assigned to the segment 701. The segment 702 derives from the non-target data table 2, thus a second weight 1 is assigned to the segment 702. Similarly, the segment deriving from the data table 2 to the data table 3 may have a second weight 1. The segment deriving from the data table 3 to the data table 4 may have a first weight 0. The segment deriving from the data table 3 to the data table 1 may have a first weight 0. The segment deriving from the data table 4 to the data table 3 may have a first weight 0.

It should be noted that the above description of the process for determining the directed graph is provided for the purpose of illustration, and not intended to limit the scope of the present disclosure. For persons having ordinary skills in the art, modules may be combined in various ways, or connected with other modules as sub-systems. Various variations and modifications may be conducted under the teaching of the present disclosure. However, those variations and modifications may not depart from the spirit and scope of this disclosure.

Figure 8:
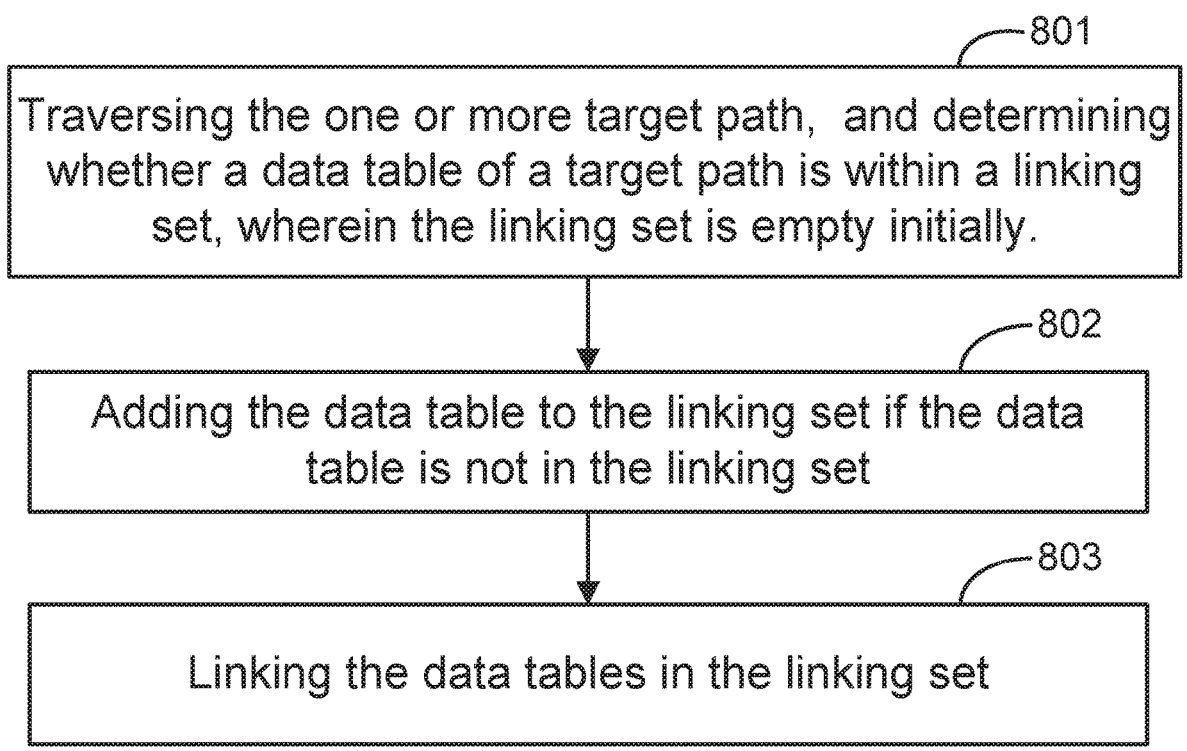

FIG. 8 is a flowchart illustrating an exemplary process for linking the data tables based on a shortest path according to some embodiments of the present disclosure. The process 600 may be executed by the system 100. For example, the process 600 may be implemented as a set of instructions (e.g., an application) stored in the storage device 130 and invoked and/or executed by the processing device 120 (e.g., the processor 210 of the computing device 200 as illustrated in FIG. 2, the GPU 330 or CPU 340 of the mobile device 300 as illustrated in FIG. 3). The processing engine 112 may execute the set of instructions and, when executing the instructions, it may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In 801, the processor (e.g., the first linking module 405 of the processing engine 112, or the traversing unit 415 of the first linking module 405) may traverse the one or more shortest paths of the directed graph. For each of the one or more shortest paths (i.e., the one or more target paths determined according to some embodiments as illustrated in FIG. 5), the processor (e.g., the first linking module 405 of the processing engine 112, or the traversing unit 415 of the first linking module 405) may determine whether a data table that the shortest path passes through has joined in a linking set. In some embodiments, the linking set may be empty initially. Then the processor (e.g., the first linking module 405 of the processing engine 112, or the traversing unit 415 of the first linking module 405) may traverse the one or more target paths. For each of the traversed target paths, the processor (e.g., the first linking module 405 of the processing engine 112, or the traversing unit 415 of the first linking module 405) may successively determine whether the data tables that the traversed target path pass through have joined in the linking set which is empty initially.

In 802, the processor (e.g., the first linking module 405 of the processing engine 112, or the adding unit 425 of the first linking module 405) may add the data table in the linking set if the data table is not in the linking set. In response to a determination that the data table that a traversed target path passes through is not within the linking set, the processor (e.g., the first linking module 405 of the processing engine 112, or the adding unit 425 of the first linking module 405) may add such a data table into the linking set. For example, as illustrated in FIG. 7A, assuming that the processor may traverse the shortest path from the data table 1 to the data table 3, the processor may add the data table 1 and 3 to the linking set since the linking set is empty initially. However, when traversing the shortest path from the data table 1 to the data table 4, the processor may add the data table 4 to the linking set since the data table 1 and the data table 3 have been added to the linking set. Finally, the linking set may include the data table 1, the data table 3 and the data table 4 after the processor have traversed all the shortest paths in the directed graph.

In 803, the processor (e.g., the first linking module 405 of the processing engine 112, or the linking unit 435 of the first linking module 405) may link the data tables in the linking set. After traverse all the shortest paths of the directed graph, the processor (e.g., the first linking module 405 of the processing engine 112, or the linking unit 435 of the first linking module 405) may link the data tables in the linking set to generate a linked data table. The linked data table may include the one or more target fields that the user wants to query, and the user may query the database based on the linked data table.

It should be noted that the above description of the process for linking the data tables based on a shortest path is provided for the purpose of illustration, and not intended to limit the scope of the present disclosure. For persons having ordinary skills in the art, modules may be combined in various ways, or connected with other modules as subsystems. Various variations and modifications may be conducted under the teaching of the present disclosure. However, those variations and modifications may not depart from the spirit and scope of this disclosure.

In some embodiment, if the reference data table cannot reach a target data table, that is, there is no path or segment between the reference data table and the target data tale, during determining the shortest distance from the reference data table to other target data tables in operation 103, the processor (e.g., the second linking module of the processing engine 112) may linking all data tables and query based on the linking result.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system configured to provide database query service to a user, comprising:
   at least one non-transitory storage medium including a set of instructions; and
   at least one processor in communication with the at least one non-transitory storage medium, wherein when executing the set of instructions, the at least one processor is directed to:
      obtain a query request to query a database, wherein the database includes a plurality of data tables;
      determine one or more target data tables among the plurality of data tables based on the query request;
      generate a directed graph based on the plurality of data tables, wherein the directed graph includes one or more segments, each of which links two data tables, wherein:
         the plurality of data tables include a first data table and a second data table that have a common field and a segment with a direct in between the first data table and the second data table,
         if the first data table is a target data table, the segment between the first data table and the second data table has a direction from the first data table to the second data table and a first weight, and
         if the first data table is not a target data table, the segment between the first data table and the second data table has a direction from the first data table to the second data table and a second weight that is larger than the first weight;
      determine a reference data table among the one or more target data tables;
      for each of the one or more target data tables,
         traverse the directed graph to determine a target path with a shortest distance between the reference data table and a target data table; and,
      query the database based on one or more target paths with the shortest distances.

2. The system of claim 1, wherein to generate the directed graph based on the plurality of data tables, the at least one processor is further directed to:
   traverse the database and determine the first data table and the second data table among the plurality of data tables; and
   generate the segment between the first data table and the second data table.

3. The system of claim 1, wherein the reference data table is randomly determined among the one or more target data tables.

4. The system of claim 1, wherein the target path with the shortest distance includes one or more data tables, and to query the database based on the one or more target paths with the shortest distances, the at least one processor is further directed to:
   generate an initial table set;
   traverse the one or more target paths;
   for each of the one or more target paths,
      determine whether a data table of the one of more data tables included in the target path is within the initial table set;
      in response to a determination that the data table of the one of more data tables included in the target path is not within the initial table set,
         add the data table of the one of more data tables into the initial table set;
      and link data tables in the initial table set to generate a linked table set; and
   query the database based on the linked table set.

5. The system of claim 1, wherein the one or more target data tables are determined based on a field of the query request.

6. A method implemented on a computing device for providing database query service to a user, the computing device including a memory and one or more processors, the method comprising:
   obtaining, by the one or more processors, a query request to query a database, wherein the database includes a plurality of data tables;
   determining, by the one or more processors, one or more target data tables among the plurality of data tables based on the query request;
   generating, by the one or more processors, a directed graph based on the plurality of data tables, wherein the directed graph includes one or more segment, each of which links two data tables, wherein:
      the plurality of data tables include a first data table and a second data table that have a common field and a segment with a direct in between the first data table and the second data table,
      if the first data table is a target data table, the segment between the first data table and the second data table has a direction from the first data table to the second data table and a first weight, and
      if the first data table is not a target data table, the segment between the first data table and the second data table has a direction from the first data table to the second data table and a second weight that is larger than the first weight;
   determining, by the one or more processors, a reference data table among the one or more target data tables;
   for each of the one or more target data tables,
      traversing, by the one or more processors, the directed graph to determine a target path with a shortest distance between the reference data table and a target data table; and
   querying, by the one or more processors, the database based on one or more target paths with the shortest distances.

7. The method of claim 6, wherein generating the directed graph based on the plurality of data tables further comprises:

traversing, by the one or more processors, the database and determine the first data table and the second data table among the plurality of data tables; and generating, by the one or more processors, the segment between the first data table and the second data table.

8. The method of claim 6, wherein the reference data table is randomly determined among the one or more target data tables.

9. The system of claim 6, wherein the target path with the shortest distance includes one or more data tables, and querying the database based on the one or more target paths with the shortest distances further comprises:

generating, by the at least one processors, an initial table set;

traversing, by the at least one processors, the one or more target paths;

for each of the one or more target paths,
  determining, by the at least one processors, whether a data table of the one or more data tables included in the target path is within the initial table set;
  in response to a determination that the data table of the one or more data tables included in the target path is not within the initial table set,
    adding, by the at least one processors, the data table of the one or more data tables into the initial table set; and linking, by the at least one processors, data tables in the initial table set to generate a linked table set; and querying, by the at least one processors, the database based on the linked table set.

10. The method of claim 6, wherein the one or more target data tables are determined based on a field of the query request.

11. A non-transitory computer readable medium embodying a computer program product, the computer program product comprising instructions configured to cause a computing device to:

obtain a query request to query a database, wherein the database includes a plurality of data tables;

determine one or more target data tables among the plurality of data tables based on the query request;

generate a directed graph based on the plurality of data tables, wherein the directed graph includes one or more segment, each of which links two data tables, wherein:
  the plurality of data tables include a first data table and a second data table that have a common field and a segment with a direct in between the first data table and the second data table,
  if the first data table is a target data table, the segment between the first data table and the second data table has a direction from the first data table to the second data table and a first weight, and
  if the first data table is not a target data table, the segment between the first data table and the second data table has a direction from the first data table to the second data table and a second weight that is larger than the first weight;

determine a reference data table among the one or more target data tables;

for each of the one or more target data tables,
  traverse the directed graph to determine a target path with a shortest distance between the reference data table and a target data table; and, query the database based on one or more target paths with the shortest distances.

12. The non-transitory computer readable medium of claim 11, wherein to generate the directed graph based on the plurality of data tables, the at least one processor is further directed to:

traverse the database and determine the first data table and the second data table among the plurality of data tables; and generate the segment between the first data table and the second data table.

\* \* \* \* \*